United States Patent [19]
Fischer et al.

[11] 3,882,029
[45] May 6, 1975

[54] WELL COMPLETION AND WORKOVER FLUID

[75] Inventors: Paul W. Fischer, Whittier; David S. Pye, Brea; Julius P. Gallus, Anaheim, all of Calif.

[73] Assignee: Union Oil Company of California, Brea, Calif.

[22] Filed: Sept. 29, 1972

[21] Appl. No.: 293,388

[52] U.S. Cl. .................. 252/8.55 R; 252/8.5 A
[51] Int. Cl. .................. E21b 21/04; C09k 3/00
[58] Field of Search .................. 252/8.55 R, 8.5 A

[56] References Cited
UNITED STATES PATENTS

| | | | |
|---|---|---|---|
| 3,302,719 | 2/1967 | Fischer | 252/8.55 R |
| 3,593,794 | 7/1971 | Fischer et al. | 252/8.55 R |
| 3,625,889 | 12/1971 | Branscum | 252/8.55 R |
| 3,684,012 | 8/1972 | Scheffel et al. | 252/8.55 R |
| 3,717,204 | 2/1973 | Scheffel et al. | 252/8.55 R |
| 3,753,903 | 8/1973 | Fischer et al. | 252/8.5 A |

*Primary Examiner*—Benjamin R. Padgett
*Assistant Examiner*—B. Hunt
*Attorney, Agent, or Firm*—Richard C. Hartman; Dean Sandford; Gerald L. Floyd

[57] ABSTRACT

A non-damaging well completion and workover fluid comprising a dispersion of finely divided, slowly oil-soluble, water-insoluble solid particles in an aqueous salt solution containing chrome lignite, hydroxyethyl cellulose and xanthan gum. The density of the fluid is controlled by varying the concentration of salt dissolved in the solution. The finely divided solid particles consist of a homogeneous solid solution of (1) wax; (2) an oil-soluble surface active glyceryl or sorbitan partial ester of a saturated higher fatty acid; (3) a water-dispersible surface active polyethylene glycol monoester of a saturated higher fatty acid; (4) an ethylene/vinyl acetate copolymer, and (5) a fatty alcohol.

8 Claims, No Drawings

3,882,029

WELL COMPLETION AND WORKOVER FLUID

This invention relates to the drilling and servicing of wells, and more particularly to aqueous well completion and workover fluids for use in drilling wells into permeable fluid-producing formations and for servicing wells drilled into such formations.

In the rotary method of drilling wells into the earth for the recovery of fluids therefrom, such as oil and/or gas contained in underlying strata thereof, or for the injection of fluids such as flood water or gas into these strata, it is conventional practice to circulate a drilling fluid downwardly through the drill pipe, outwardly through apertures in a bit mounted at the end of the drill pipe, and upwardly through the annulus to the surface. The drilling fluid cools the bit, transports cuttings out of the bore hole, prevents sluffing or caving of the walls of the hole, and prevents well blowouts when drilling into strata containing fluids at elevated pressure. While a wide variety of drilling fluid compositions have been proposed, most of these fluids contain suspended clays or other solid matter that enter into the permeable strata or deposit on the exposed wall of the well resulting in a permanent reduction in the permeability of the formation rendering it less susceptible to fluid flow between the well and the formation.

In a well completion operation, i.e., in the stage of the drilling operation wherein the bore hole is drilled into or through a petroleum producing strata, it is desirable to employ a drilling fluid which does not impair the permeability or productivity of the producing strata. Similarly, in the placement of gravel packs in a well and in workover and other well servicing operations in which permeable oil-bearing strata are contacted by a workover fluid, it is desirable to employ a workover fluid that does not reduce the permeability of or otherwise damage the producing strata.

While clear water and various brines and viscous aqueous solutions have been proposed as well completion and workover fluids, these fluids generally do not possess the requisite properties of density, viscosity, gel strength, stability, and low fluid loss desired for these applications. Hence, need exists for a non-damaging well completion and workover fluid having the requisite properties for use in completing wells in permeable strata and in conducting workover and similar operations in such wells, but which will not result in any substantial permanent damage to the permeable strata which it contacts.

Accordingly, it is a principal object of this invention to provide an improved well completion and workover fluid.

Another object of the invention is to provide a water base completion or workover fluid that results in no substantial permanent reduction in the permeability of the porous strata which it contacts.

Still another object of this invention is to provide a substantially clay-free well completion and workover fluid.

Yet another object of this invention is to provide a non-damaging well completion and workover fluid that exhibits the requisite properties of density, viscosity, gel strength and fluid loss.

A further object of the invention is to provide a water base completion and workover fluid that can be readily prepared at the well site.

Other objects and advantages of the invention will be apparent from the following description.

Briefly, the well completion and workover fluids of this invention comprise dispersions of finely divided, slowly oil-soluble, water-insoluble solid particles in an aqueous salt solution containing chrome lignite, hydroxyethyl cellulose and xanthan gum. The finely divided, oil-soluble, water-insoluble solid particles are a particulated homogeneous solid solution of (1) wax; (2) an oil-soluble surface active glyceryl or sorbitan partial ester of a saturated higher fatty acid; (3) a water-dispersible surface active polyethylene glycol monoester of a saturated fatty acid; (4) an ethylene/vinyl acetate copolymer, and (5) a fatty alcohol. The density of the fluid is controlled by varying the concentration of salts dissolved in the solution.

Fluid compositions useful as completion and workover fluids must exhibit a number of desirable properties to facilitate their use in these applications. These properties are summarized as follows:

DENSITY (MUD WEIGHT)

It is important that the density of the drilling fluid be sufficiently high that the hydrostatic pressure of the fluid column in the well holds loosely consolidated caving formations in place and exceeds the formation pressures encountered. A test for measuring drilling fluid density is set forth in the publication entitled "Standard Procedure for Testing Drilling Fluids, Section 1, Density (Mud Weight)," API RECOMMENDED PRACTICE, American Petroleum Institute, API RP 13 B, April, 1969, Pages 3–4.

VISCOSITY AND GEL STRENGTH

Viscosity is a measure of the internal resistance of a fluid to flow; higher viscosity indicating greater resistance. The viscosity of a drilling fluid affects several important functions, and means must be provided to control viscosity during various phases of an operation. For example, it is usually desired to employ low viscosity fluids to favorably affect the drilling rate, to improve mud circulation, and to promote the separation of cuttings from the drilling fluid. Yet, increased viscosity generally enhances the mud carrying capacity of the fluid, reduces fluid loss, and tends to promote conditioning of the formation to minimize caving and water damage to water-sensitive formations. Thus, in a drilling operation, the viscosity of the drilling fluid must be controlled to compromise these various functions. Also, it is desirable to specifically adjust the viscosity of the drilling fluid in certain operations such as running casing, logging and cementing.

Viscosity can be measured by a Fann motor-driven viscosimeter as described in "Standard Procedure for Testing Drilling Fluids, Section 2, Viscosity and Gel Strength," API RECOMMENDED PRACTICE, ibid., pages 5 and 6. This apparatus is operated at speeds of 300 and 600 rpm, and has an attachment for determining gel strength. The apparent viscosity in centipoises equals the 600 rpm reading divided by 2. The plastic viscosity in centipoises equals the 600 rpm reading minus the 300 rpm reading.

The gel strength of drilling fluids is a measure of the minimum shearing stress necessary to produce slip-wise movement. Gel strength affects the solids carrying capacity of the fluid. When a drilling fluid possesses finite gel strength, all cuttings up to a certain size and density will be removed from the hole no matter how low the upward velocity may be. The gel strength of the drilling fluid must be sufficient to prevent cuttings and other solids settling to the bottom of the hole, even during periods when mud circulation is temporarily stopped. In a similar manner, loose material in crevices and interstices will be secured and prevented from entering the hole. The optimum gel strength varies with the weight and viscosity of the fluid, and with the size of the cuttings or cavings entrained in the drilling fluid. While it is important that the drilling fluid remove all cuttings from the hole and hold them in suspension during interruptions in drilling, it is equally important that the consistency of the fluid allow the sand and cuttings to be removed in the cyclones and/or settling pits. These seemingly opposite functions may be achieved by careful control of viscosity and gel strength in conjunction with the use of proper separation equipment. Gel strength in pounds per 100 square feet is determined with the Fann motor-driven viscosimeter by use of a special attachment, and is usually measured immediately after stirring and after a 10-min. quiescent period. These are reported as the initial and 10-minute gel strengths.

The yield point is a measure of that part of flow resistance arising from attractive forces between the solid particles in the drilling fluid. Yield point in pounds per 100 square feet equals the 300 rpm reading on the Fann motor-driven viscosimeter minus the plastic viscosity.

FLUID LOSS

The filtration property of drilling fluids is a measure of the ability of the solid components of the drilling fluid to form a thin, low-permeability filter cake. This property is dependent upon the amount and physical state of the solid material in the drilling fluid. It has been shown repeatedly in the field that when drilling fluid containing proper solids is used, a thin low-permeability cake is formed which minimizes difficulties. In contrast, a thick cake restricts the passage of tools and allows an excessive amount of filtrate to pass into the formation, thus increasing the possibility of formation damage. Lack of proper wall building properties may result in further trouble such as difficulty in running casing, creating a swabbing effect which may cause the formation to heave or swab reservoir contents into the hole, and difficulty in securing a water shutoff because of channeling of cement. The filtration and wall building characteristics of a drilling fluid are determined by an API fluid loss test described in "Standard Procedure for Testing Drilling Fluids, Section 3, Filtration," API RECOMMENDED PRACTICE, ibid, pages 8 and 9.

pH

The pH of a drilling fluid is an important characteristic and can be measured by the methods described in "Standard Procedure for Testing Drilling Fluids, Section 6, pH," API RECOMMENDED PRACTICE, ibid., page 12. pH provides an indication of cement contamination. High pH is to be avoided with the completion and workover fluids of this invention since the xanthan gum is flocculated and stability decreased at a pH above about 10.

STABILITY

The stability of an emulsion or dispersed phase drilling fluid is defined as the tendency of the dispersed phase to separate from the bulk fluid as a function of time. Drilling fluids should exhibit good stability to prevent separation of the dispersed phase in the hole and in the mud pit. One method of determining the stability of a drilling fluid dispersion is to place a quantity of well-mixed fluid in a transparent container and to determine the percent of separate phase formed under quiescent conditions as a function of time.

It is desired that well completion and workover fluids be substantially non-damaging to the permeable formations which they contact. By "substantially non-damaging" it is meant that upon a fluid contacting a permeable formation at elevated pressure, the permeability of the formation will not be less than 90 percent of its initial permeability, or the permeability can be restored to this value by a simple swabbing with oil. In addition to this non-damaging capability, the following summarize other desirable properties for fluids used in well completion and workover operations:

| | |
|---|---|
| Density | - controllable up to 85 lbs/cu. ft. |
| Apparent viscosity | - controllable over the range of 3 to 25 cp |
| Gel strength | |
| initial | - 5 lbs/100 sq. ft. maximum |
| 10-minute | - 5 to 15 lbs/100 sq. ft. |
| Fluid loss, API | - 10 ml/30 minutes maximum |
| Stability | - less than 25% separation in 24 hours. |

We have discovered a fluid composition that exhibits the requisite properties and that constitutes a highly desirable workover and completion fluid. This composition comprises a dispersion of about 4 to 10 pounds per barrel of finely divided particles of a slowly oil-soluble, water-insoluble solid low fluid loss additive in an aqueous salt solution containing about 1 to 5 pounds per barrel of chrome lignite, about 0.1 to 2 pounds per barrel of xanthan gum, and sufficient hydroxyethyl cellulose to obtain the desired viscosity. Viscosity control can usually be achieved by the addition of about 0.1 to 1 pound of hydroxyethyl cellulose per barrel of fluid. The term "barrel" used herein refers to a liquid volumetric measure containing 42 gallons used extensively in the petroleum industry.

The slowly oil-soluble, water-insoluble, particulate low fluid loss additive is a particulated homogeneous solid solution of wax, a selected oil-soluble surface active agent, a selected water-dispersible surface active agent, an ethylene/vinyl acetate copolymer, and a fatty alcohol. By the term "homogeneous solid solution," it is meant that the ingredients are dissolved in the wax or substantially uniformly dispersed therein to provide a homogeneous solid composition. If desired, finely divided oil-insoluble solid materials such as silica, calcium carbonate, and the like; or finely divided, high density inorganic weighting agents such as litharge and the like, can be dispersed in the homogeneous solid solution. However, in many applications it is desired that the solid solution be free of insoluble inorganic materials so that the solid particle can be completely dissolved in oil.

Any of a wide variety of waxes can be employed in the compositions of this invention. Suitable waxes include crystalline and microcrystalline petroleum waxes, beeswax, carnauba wax, condellia wax, montan wax, and the like. One preferred class of waxes includes the fully and partially refined paraffin waxes melting between about 125° and 170° F. Another class of waxes and wax-like substances that can be employed, particularly in higher temperature applications, are long chain aliphatic hydrocarbon and oxidized hydrocarbon waxes melting above about 170° F., such as the synthetic Fischer-Tropsch waxes. These waxes are characteristically straight or branched chain aliphatic hydrocarbons and oxygenated aliphatic hydrocarbons such as aliphatic carboxylic acids, esters and amides having molecular weights higher than the paraffin waxes, and particularly having molecular weights of about 500 to 2500. A preferred class of synthetic waxes are long chain aliphatic hydrocarbon and oxidized hydrocarbon waxes melting between about 195° and 250° F.

The waxes incorporated into the compositions of this invention are selected for their melting points and solubility in oil. The selected wax must exhibit a melting point above the maximum temperature to which it will be subjected, and preferably at least about 10° F. above this temperature. Also, the wax should be at least slowly soluble in oil so that it will not permanently damage oil-bearing strata of the formation, and if necessary, can be removed by swabbing the well with oil. The waxes useful in the particulate low fluid loss additive composition can be a blend of two or more of the aforementioned waxes.

The ethylene/vinyl acetate copolymer is a copolymer of ethylene and vinyl acetate containing between about 10 and 30 weight percent vinyl acetate and exhibiting a Melt Index of less than about 20. A particularly preferred ethylene/vinyl acetate copolymer contains about 17 to 19 weight percent vinyl acetate and exhibits a Melt Index of about 2 to 3. The polymer improves the strength of the solid particles, reduces surface tackiness, and decreases the oil solubility of the agent.

The oil-soluble surface active agent employed in the low fluid loss additive composition is a glyceryl or sorbitan higher fatty acid partial ester, exemplary of which are the glyceryl and sorbitan mono-and di-esters of saturated fatty acids containing between 12 and 20 carbon atoms. Specific esters that can be employed in these compositions include glyceryl monolaurate, glyceryl monomyristate, glyceryl monopalmitate, glyceryl monostearate, glyceryl 1,3-distearate, sorbitan monolaurate, sorbitan monomyristate, sorbitan monopalmitate, sorbitan monostearate, and sorbitan 1,3-distearate. Preferred oil-soluble surface active agents are glyceryl and sorbitan monostearate.

The water-dispersible surface active agent is a water-dispersible polyethylene glycol higher fatty acid ester. Exemplary polyethylene glycol higher fatty acid esters include esters of polyethylene glycols having molecular weights of about 300 to 10,000 and saturated fatty acids containing between 12 and 20 carbon atoms. Specific polyethylene glycol fatty acid esters include polyethylene glycol monolaurate, polyethylene glycol monomyristate, polyethylene glycol monopalmitate, and polyethylene glycol monostearate esters of polyethylene glycols having molecular weights of about 300 to 10,000. Preferred surface active compounds include polyethylene glycol 300 monolaurate, polyethylene glycol 900 monostearate, polyethylene glycol 1000 monostearate, polyethylene glycol 4000 monostearate, and polyoxyethylene glycol 6000 monostearate. The designations "300," "900," "1000," "4000" and "6000" indicate the approximate molecular weight of the polyethylene glycol employed to form the ester. A particularly preferred water-dispersible surface active agent is polyethylene glycol 6000 monostearate.

It has been found that many of the oil-soluble, water-insoluble formulations used in preparing the particulate compositions of this invention are incompatible in the liquid state under certain temperature conditions, i.e., the molten liquid ingredients of the composition tend to separate into separate liquid phases. This incompatibility is particularly observed as the molten compositions are cooled to the solidification temperature. Thus, a single phase homogeneous liquid may be obtained at the mixing temperature, which separates into two separate phases on cooling. Phase separation causes nonuniformity of the solid solution resulting in a poor additive material. Phase separation can be avoided and a uniform homogeneous product obtained by incorporating into the composition a small amount of an oil-soluble fatty alcohol containing 10 to 14 carbon atoms. Exemplary fatty alcohols include decyl alcohol, lauryl alcohol, and myristyl alcohol, with lauryl alcohol being particularly preferred. The concentration of fatty alcohol required to achieve homogeniety is critical, with separation of the constituents occurring both with too low and with excessive concentrations of fatty alcohol. While the critical concentration of fatty alcohol generally falls within the range of about 0.5 to 5 weight percent, the concentration required to obtain homogeniety depends upon the specific composition of the solid solution and the fatty alcohol employed, and is generally within a range of about ±0.5 weight percent within this range. For example, the critical composition of a specific fatty alcohol required to render a given composition homogeneous may vary from about 1.5 to 2.5 weight percent. The concentration of fatty alcohol required for any specific composition can be determined experimentally.

Broadly, the oil-soluble, water-insoluble low fluid loss additive is a homogeneous solid solution of about 30 to 75 weight percent of wax, about 10 to 25 weight percent of oil-soluble surface active agent, about 15 to 35 weight percent of water-dispersible surface active agent, about 1 to 4 weight percent of ethylene/vinyl acetate copolymer and about 0.5 to 5 weight percent of fatty alcohol. A preferred composition comprises about 45 to 55 weight percent of wax, about 15 to 20 weight percent of oil-soluble surface active agent, about 25 to 30 weight percent of water-dispersible surface active agent, about 1 to 4 weight percent of ethylene/vinyl acetate copolymer, and about 1 to 4 weight percent of fatty alcohol. One particularly preferred composition is a homogeneous solid solution of about 45 to 55 weight percent paraffin wax having a melting point of about 165° F., about 15 to 20 weight percent of glyceryl monostearate or sorbitan monostearate, about 25 to 30 weight percent of polyethylene glycol 6000 monostearate, about 1 to 4 weight percent of an ethylene/vinyl acetate copolymer containing about 17 to 19 weight percent vinyl acetate and exhibiting a Melt Index of about 2 to 3, and about 1.5 to 2.5 weight percent of lauryl alcohol.

The oil-soluble, water-insoluble low fluid loss additive is prepared by heating the ingredients to a temperature above the melting point of the highest melting ingredient, such as to a temperature between about 200° and 500° F., and mixing the molten ingredients to obtain a homogeneous liquid mass of uniform composition. The molten mass is then particulated and solidified by prilling in a flowing stream of cold gas, or alternatively, the molten mass can be cooled until solidified and then particulated by grinding.

It is preferred that the solid particles of low fluid loss additive have mean diameters between about 0.1 and 50 microns. A particularly preferred low fluid loss additive consists of finely divided, noncolloidal solid particles wherein substantially none of the particles have diameters greater than about 50 microns nor smaller than about 0.1 micron. While the particles may be of a uniform size within the aforesaid size range, fluid loss control is enhanced when the particles are of varying sizes distributed throughout the operable size range. An especially preferred additive comprises a mixture of various size solid particles wherein between about 60 and 90 weight percent of the particles are within the 0.1 to 20 micron size range, and the balance of the particles within the 20 to 50 micron size range.

The chrome lignite employed in the non-damaging completion and workover fluid of this invention is an admixture of approximately 20 weight percent sodium chromate and 70 weight percent of a sodium lignite prepared by treating lignite coal with caustic. The chrome lignite typically contains about 10 weight percent of clay and other impurities. A suitable chrome lignite is marketed by the Dresser Magobar division of Dresser Industries, Inc. under the trademark XP-20 stabilizer. The chrome lignite synergestically cooperates with the low fluid loss additive to reduce fluid loss to the formation, particularly in higher permeability strata.

Xanthan gum is a high molecular weight linear polysaccharide that is readily soluble in water to form a viscous, highly Newtonian fluid. Exemplary of the xanthan gums that can be employed is an industrial grade of xanthan gum marketed by the Kelco Company under the trademark Kelzan XC xanthan gum. Xanthan gum increases the gel strength of the fluid without appreciably increasing its viscosity.

Hydroxyethyl cellulose is prepared by treating cellulose with caustic and then reacting the caustic treated cellulose with about 1 to 3 moles of ethylene oxide for each anhydroglucose unit in the cellulose molecule. The viscosity of an aqueous solution of hydroxyethyl cellulose depends upon the concentration and molecular weight of the hydroxyethyl cellulose. Broadly, the hydroxyethyl cellulose employed in the practice of this invention has about 1 to 3 moles of substituent ethylene oxide per anhydroglucose unit and is characterized by a Brookfield viscosity of about 1,500 to 5,000 centipoises at 25° C. for a 1 weight percent solution thereof. A preferred hydroxyethyl cellulose has about 2.5 moles of substituent ethylene oxide per anhydroglucose unit and is characterized by a viscosity of about 1,500 to 2,500 centipoises at 25° C. for a 1 weight percent solution. A suitable hydroxyethyl cellulose is marketed by Hercules Incorporated under the trademark Natrosol 250 HR hydroxethyl cellulose. Hydroxyethyl cellulose is employed to increase the viscosity of the fluid and to increase the stability of the dispersion.

The dissolved salts prevent or inhibit hydration of the water-sensitive components of the formation and increase the density of the fluid composition. The fluid contains at least about 1 weight percent dissolved salts to inhibit hydration of the water-sensitive clays. Also, the density (mud weight) can be increased by the addition of dissolved salts, the maximum density being limited by the solubility of the salts. The concentration of salts must be maintained below the saturation concentration at the temperatures to which the fluid will be subjected to prevent salting out, i.e., solids precipitation. While the maximum mud weight is dependent upon the particular salt or salts dissolved in the fluid and the temperature, mud weight can generally be increased from the minimum of about 63 pounds per cubic foot up to about 85 pounds per cubic foot by the control of salt concentration.

Inorganic salts which can be dissolved in the fluid include alkali metal and ammonium halides and nitrates. The preferred salts include sodium, potassium, and ammonium halides, and particularly sodium chloride, potassium chloride, and ammonium chloride. Either a single salt may be dissolved in the fluid, or a mixture of salts can be employed. The preferred concentration ranges for various salts are listed in Table 1.

TABLE 1

PREFERRED CONCENTRATION RANGES FOR VARIOUS SALTS
| Salt | Concentration Range, Wt. % |
| --- | --- |
| Sodium chloride | 1 – 10 |
| Ammonium chloride | 1 – 20 |
| Potassium chloride | 1 – 22 |
| Sodium nitrate | 1 – 20 |
| Ammonium nitrate | 1 – 40 |
| Potassium nitrate | 1 – 30 |

The completion and workover fluid can include other conventional agents such as foam depressants, corrosion inhibitors, and the like.

The completion and workover fluid compositions of this invention are prepared by admixing the desired proportion of the various ingredients with water. All of the ingredients are fairly readily dissolved or dispersed in water by circulation through the conventional mud mixing equipment of a rotary drilling rig. Preferably, the salt is dissolved in the aqueous fluid after the polymeric agents since high salt contents inhibit dissolution of these agents.

A preferred aqueous dispersion useful as a well completion and workover fluid is comprised of about 5 to 9 pounds of oil-soluble, water-insoluble fluid loss agent, about 2 to 4 pounds of chrome lignite, about 0.5 to 1.5 pounds of xanthan gum, about 0.1 to 1 pound of hydroxyethyl cellulose, at least about 3.5 pounds of a water-soluble inorganic alkali metal or ammonium salt, all per barrel of fluid composition, and, if necessary, sodium hydroxide in an amount to adjust the pH to a value between about 7 and 9.5, and water to make one barrel.

A particularly preferred composition is comprised of about 7 pounds of a particulated, oil-soluble, water-insoluble fluid loss additive comprised of a homogeneous solid solution of 51 weight percent of paraffin wax having a melting point of about 165° F., 18 weight percent of sorbitan monostearate, 27 weight percent of polyethylene glycol 6000 monostearate, 2 weight percent of ethylene/vinyl acetate copolymer and 2 weight percent of lauryl alcohol, said particles having the above described preferred size distribution within the range of about 0.1 to 50 microns; 3 pounds of chrome lignite; 1 pound of xanthan gum, 0.5 pound of hydroxyethyl cellulose, at least about 3.5 pounds of potassium chloride; sodium hydroxide in an amount to adjust the pH to a value between about 7 and 9.5, and water to make one barrel. This particularly preferred composition exhibits the following properties:

| | | |
|---|---|---|
| Fluid Loss, API, ml/30 min. | 7 | |
| Viscosity, apparent, cp | 20 | |
| Gel Strength, lbs/100 sq. ft, initial | 2 | |
| Gel Strength, lbs/100 sq. ft, 10 min. | 10 | |
| Density, lbs/cu. ft. | 64.2 | minimum |
| Stability, % separation in 24 hours | 5 | |

The invention is further described by the following examples which are illustrative of specific modes of practicing the invention and are not intended as limiting the scope of the invention as defined by the appended claims.

EXAMPLE 1

A slowly oil-soluble, water-insoluble low fluid loss additive is prepared by melting and combining 51 weight percent of a 165° F. melting point paraffin wax, 18 weight percent of sorbitan monostearate, 27 weight percent of polyethylene glycol 6000 monostearate, 2 weight percent of an ethylene/vinyl acetate copolymer containing about 17 to 19 weight percent vinyl acetate and exhibiting a Melt Index of 2.1 to 2.9, and 2 weight percent lauryl alcohol. The molten ingredients are gently mixed to obtain a homogeneous liquid composition which is particulated to obtain finely divided solid particles of the following size range:

| Size Range, Microns | Weight Percent |
|---|---|
| 1–4 | 0.96 |
| 4–10 | 25.72 |
| 10–20 | 54.86 |
| 20–30 | 15.47 |
| 30–40 | 1.92 |
| 40–50 | 0.86 |
| over 50 | 0.21 |

A well completion and workover fluid is prepared by admixing this low fluid loss additive, chrome lignite, xanthan gum, hydroxyethyl cellulose, and potassium chloride into water. These ingredients are added in the following proportions:

| | lbs/bbl |
|---|---|
| Low fluid loss additive | 7 |
| Chrome lignite | 3 |
| Xanthan gum | 1 |
| Hydroxyethyl cellulose | 0.5 |
| Potassium chloride | 10 |

EXAMPLE 2

The well completion and workover fluid is employed in recompleting a 5,000 foot producing oil well. In this operation the well is cemented below the 3,000 foot level and a slot is milled in the casing between the 3,000 and 3,100 foot levels. The well is then cemented back to the 2,800 foot level, and then side track drilled through the casing wall to a depth of 3,300 feet employing the completion and workover fluid prepared in Example 1. A highly permeable high-pressure zone is encountered below 3,300 feet, and ground walnut hulls are added to the drilling fluid as a lost circulation additive. Potassium chloride is added to the drilling fluid to increase the mud density to about 76 lbs/ft³ and the well drilled to 4,120 feet with the shakers bypassed to avoid removal of the solid lost circulation additive. The shakers are then placed in operation to remove the walnut hulls and the well drilled to 4,000 feet. An oil-soluble, water-insoluble particulated solid lost circulation additive marketed by the Union Oil Company of California under the trademark Unibeads O.S. 90 is added to the drilling fluid when drilling into the permeable producing zone. The well is drilled to a depth of 4,990 feet, then cemented back to 4,790 feet, underreamed, and slotted liner set between 4,450 and 4,790 feet. The well is placed on production.

The drilling fluid prepared in accordance with Example 1 is employed in all phases of the workover and drilling operation. The drilling fluid exhibited satisfactory properties at all stages of the operation. After the initial production rate is stabilized, the production from this well is found to be higher than adjacent wells using conventional drilling fluids.

EXAMPLE 3

A well completion and workover fluid is prepared substantially in accordance with the method described in Example 1 excepting that glyceryl monostearate is substituted for the sorbitan monostearate used in preparing the particulate solid low fluid loss agent.

While particular embodiments of the invention have been described, it will be understood, of course, that the invention is not limited thereto since many modifications can be made and it is intended to include within the invention such modifications as are within the scope of the claims.

The invention having thus been described, we claim:

1. An aqueous well completion and workover fluid comprising a dispersion of about 4 to 10 pounds per barrel of finely divided, oil-soluble, water-insoluble solid particles in an aqueous salt solution containing about 1 to 5 pounds per barrel of chrome lignite, about 0.1 to 2 pounds per barrel of xanthan gum, about 0.1 to 1 pound per barrel of hydroxyethyl cellulose, and at least about 1 weight percent of a water-soluble inorganic alkali metal or ammonium salt, said particles comprising a homogeneous solid solution of (1) wax, (2) an oil-soluble surface active glyceryl or sorbitan partial ester of a saturated higher fatty acid, (3) a water-dispersible surface active polyethylene glycol monoester of a saturated higher fatty acid, (4) an ethylene/vinyl acetate copolymer, and (5) a fatty alcohol.

2. The composition defined in claim 1 wherein said finely divided, oil-soluble, water-insoluble particles have average diameters within the range of about 0.1 to 50 microns.

3. The composition defined in claim 1 wherein said hydroxyethyl cellulose contains about 1 to 3 moles of substituent ethylene oxide for each anhydroglucose unit of the cellulose and is characterized by a Brookfield viscosity of about 1,500 to 5,000 centipoises at 25° C. for a 1 weight percent aqueous solution thereof.

4. The composition defined in claim 1 wherein said water-soluble, inorganic alkali metal or ammonium salt is an alkali metal or ammonium chloride.

5. The composition defined in claim 1 wherein said ethylene/vinyl acetate copolymer contains about 10 to 30 weight percent of vinyl acetate and exhibits a Melt Index of less than about 20 grams/10 minutes.

6. The composition defined in claim 1 wherein said fatty alcohol is a saturated fatty alcohol containing between about 10 and 14 carbon atoms.

7. An aqueous well completion and workover fluid comprising a dispersion of about 4 to 10 pounds per barrel of finely divided, oil-soluble, water-insoluble solid particles in an aqueous salt solution containing about 1 to 5 pounds per barrel of chrome lignite, about 0.1 to 2 pounds per barrel of xanthan gum; about 0.1 to 1 pound per barrel of a hydroxyethyl cellulose having about 1 to 3 moles of substituent ethylene oxide per anhydroglucose unit of the cellulose and that is characterized by a viscosity of about 1,500 to 5,000 centipoises for a 1 weight percent solution thereof; and at least about 1 weight percent of an alkali metal or ammonium halide or nitrate; said particles comprising a homogeneous solid solution of (1) about 45 to 55 weight percent of paraffin wax, (2) about 15 to 20 weight percent of glyceryl or sorbitan monostearate, (3) about 25 to 30 weight percent of polyethylene glycol monostearate, (4) about 1 to 4 weight percent of an ethylene/vinyl acetate copolymer containing about 10 to 30 weight percent vinyl acetate and exhibiting a Melt Index of less than 20 grams/10 minutes, and (5) a saturated fatty alcohol containing about 10 to 14 carbon atoms, said particles having average diameters in the range of about 0.1 to 50 microns.

8. An aqueous well completion and workover fluid comprising a dispersion of about 5 to 9 pounds per barrel of finely divided, oil-soluble, water-insoluble solid particles in an aqueous salt solution containing about 2 to 4 pounds per barrel of chrome lignite; about 0.5 to 1.5 pounds per barrel of xanythan gum; about 0.1 to 1 pound per barrel of a hydroxyethyl cellulose having about 2.5 moles of substituent ethylene oxide per anhydroglucose unit of the cellulose and that is characterized by a viscosity of about 1,500 to 2,500 centipoises at 25° C. for a concentration of 1 percent thereof; and at least about 1 weight percent of potassium chloride; said particles comprising a homogeneous solid solution of (1) about 45 to 55 weight percent of a paraffin wax having a melting point of about 165° F., (2) about 15 to 20 weight percent of glyceryl or sorbitan monostearate, (3) about 25 to 30 weight percent of polyethylene glycol 6000 monostearate, (4) about 2 weight percent of an ethylene/vinyl acetate copolymer containing about 17 to 19 weight percent of vinyl acetate and exhibiting a Melt Index of 2 to 3 grams/10 minutes, and (5) about 1.5 to 2.5 weight percent of lauryl alcohol, said particles having average diameters in the range of about 0.1 to 50 microns.

* * * * *